(12) United States Patent
Recksiek et al.

(10) Patent No.: US 7,048,234 B2
(45) Date of Patent: May 23, 2006

(54) ADAPTIVE FLAP AND SLAT DRIVE SYSTEM FOR AIRCRAFT

(75) Inventors: Martin Recksiek, Hamburg (DE); Harald Rechter, Bremen (DE); Wolfgang Besing, Osterholz Scharmbeck (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/812,507

(22) Filed: Mar. 29, 2004

(65) Prior Publication Data

US 2005/0151027 A1  Jul. 14, 2005

(30) Foreign Application Priority Data

Mar. 27, 2003  (DE) .................. 103 13 728

(51) Int. Cl.
B64C 13/38  (2006.01)

(52) U.S. Cl. .............. 244/213; 244/75.1; 244/99.1

(58) Field of Classification Search ........ 244/213–216, 244/75 R, 28; 246/75.1, 99.4, 99.5
See application file for complete search history.

(56) References Cited

U.S. PATENT DOCUMENTS

| | | | |
|---|---|---|---|
| 2,295,306 A | 9/1942 | Tampier | |
| 4,260,121 A | 4/1981 | Baston et al. | |
| 4,575,027 A * | 3/1986 | Cronin | .............. 244/75 R |
| 4,688,744 A | 8/1987 | Aldrich | |
| 4,715,567 A | 12/1987 | Poccard | |
| 4,765,568 A * | 8/1988 | Carl et al. | .............. 244/75 R |
| 4,779,822 A | 10/1988 | Burandt et al. | |
| 4,892,274 A * | 1/1990 | Pohl et al. | .............. 244/213 |
| 4,964,599 A | 10/1990 | Farineau | |
| 5,743,490 A * | 4/1998 | Gillingham et al. | ...... 244/75 R |
| 6,200,223 B1 | 3/2001 | Martens | |
| 6,257,528 B1 * | 7/2001 | Brislawn | .............. 244/211 |
| 6,481,667 B1 * | 11/2002 | Ho | .............. 244/75 R |
| 6,739,550 B1 * | 5/2004 | Koizumi et al. | ........ 244/75 R |
| 6,755,375 B1 * | 6/2004 | Trikha | .............. 244/75 R |
| 2004/0200928 A1 * | 10/2004 | Degenholtz et al. | ...... 244/75 R |
| 2005/0029407 A1 | 2/2005 | Pohl et al. | |
| 2005/0151028 A1 | 7/2005 | Pohl et al. | |

FOREIGN PATENT DOCUMENTS

EP  1038765  9/2000

* cited by examiner

Primary Examiner—Galen Barefoot
(74) Attorney, Agent, or Firm—W. F. Fasse; W. G. Fasse

(57) ABSTRACT

A drive station includes two drives connected via drive transmissions to one or more flaps or slats of a flap/slat group. The drives may be mechanically coupled to a rotational shaft, with a shaft brake arranged thereon. Guide transmissions are connected to the shaft and to respective flaps or slats of the flap/slat group. Alternatively, the two drives are not mechanically coupled, but are merely electrically or electronically synchronized. Each flap/slat group can be actuated individually and independently of the other groups by actuation commands provided by a central control unit connected to the drives and to a flight controller. Position sensors provide actual position feedback. Each flap/slat is driven by two transmissions, namely two drive transmissions, or two guide transmissions, or one drive transmission and one guide transmission. A redundant drive path is ensured if a component fails.

29 Claims, 6 Drawing Sheets

Fig. 1 PRIOR ART
AIRBUS A 340 LANDING FLAP SYSTEM

Fig. 2 PRIOR ART
BOEING B 747 LANDING FLAP SYSTEM

ADAPTIVE FLAP AND SLAT DRIVE SYSTEM FOR AIRCRAFT

CROSS-REFERENCE TO RELATED APPLICATIONS

This application is related to U.S. application Ser. No. 10/868,175 filed Jun. 14, 2004 and U.S. application Ser. No. 11/021,723 filed Dec. 22, 2004.

This application is based on and claims the priority under 35 U.S.C. §119 of German Patent Application 103 13 728.9 filed on Mar. 27, 2003, the entire disclosure of which is incorporated herein by reference.

FIELD OF THE INVENTION

The invention relates to a drive system for trailing edge flaps and/or leading edge slats on a fixed wing of an aircraft, including at least one flap/slat control unit and at least one drive or actuator for selectively actuating the extension and retraction or deflection movement of the slats and/or flaps.

BACKGROUND INFORMATION

Fixed wing aircraft are exemplified in civil aviation by modern passenger transport aircraft, such as the various aircraft models manufactured by Airbus and Boeing. Such fixed wing aircraft typically include slats movably arranged along the leading edge of each wing, and flaps movably arranged along the trailing edge of each wing. By selectively extending and retracting, and/or selectively deflecting, such flaps and/or slats, the aerodynamic flow conditions on the respective wing are influenced so as to increase the lift generated by the wing, for example especially for take-off and landing phases of flight of the aircraft. In general, such flaps and slats are known as lift-enhancing devices, which can also be categorized as take-off aids or landing aids. These lift-enhancing devices taken collectively form the flap system of the aircraft, which is monitored and also regulated with respect to the flight situation or configuration by a flight control arrangement of the aircraft, for example in order to carry out a take-off and/or landing on an airport runway in an optimal manner. In this regard, the actual current flight data of the aircraft are continuously provided to the aircraft flight control arrangement, which in turn regulates the actuation of the components of the flap system in a manner depending on the particular flight situation at hand, in order to vary the camber of the lifting wing profile, to vary the lifting wing surface area, and/or to influence the boundary layer so as to adjust the lift and drag characteristics of the wing as required.

Figure 1:
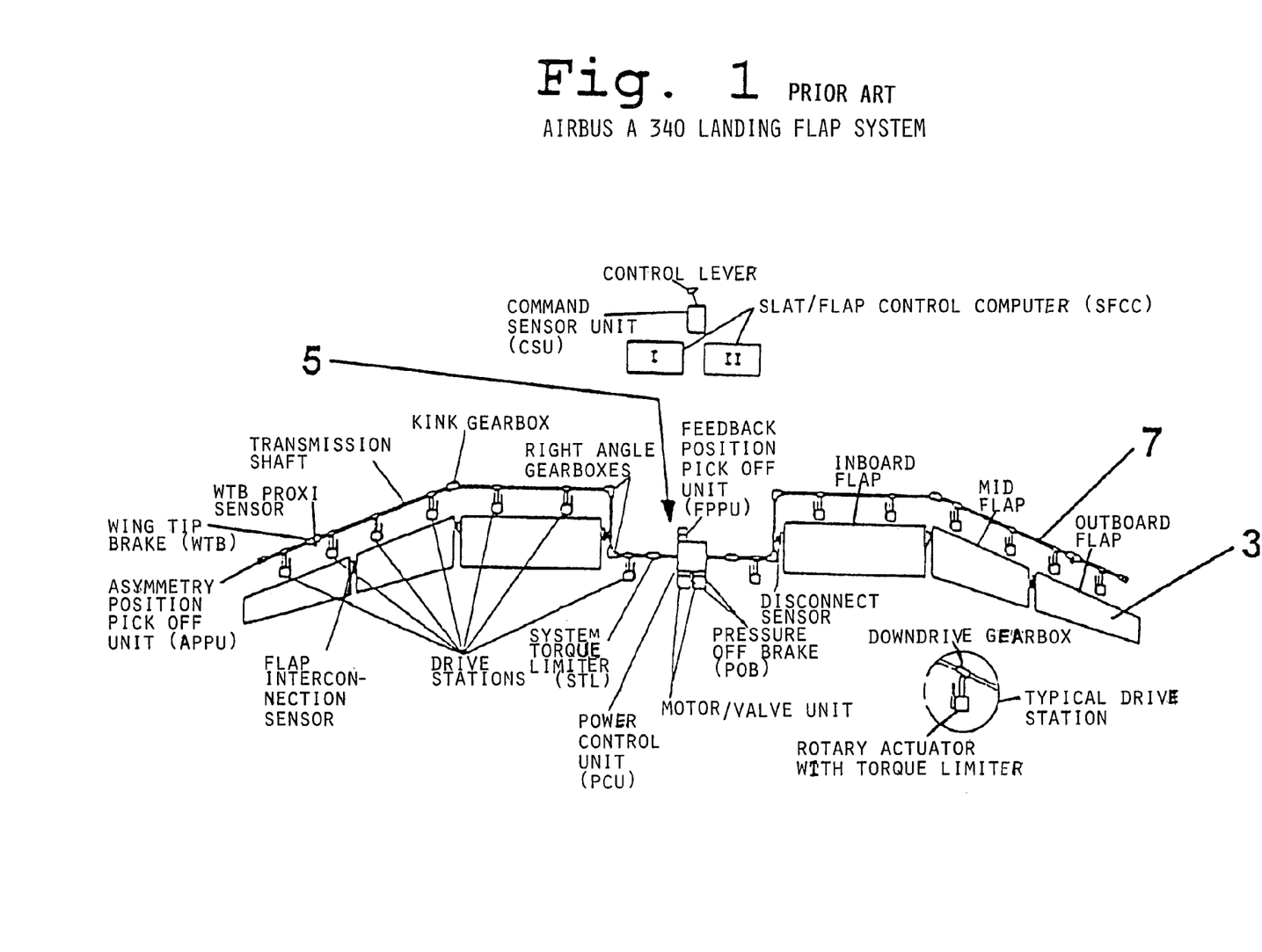
FIG. 1 is a schematic overview of the conventional landing flap system of an Airbus A340 aircraft.

Conventional flap systems typically include a central drive motor, drive transmission stations of the leading edge slats and of the trailing edge flaps, and a continuous through-going transmission shaft that forms a centralized shaft line which transmits the drive power from the central drive motor to the several drive stations. A typical example of such a conventional arrangement is shown in FIG. 1, which relates to the landing flap system of the Airbus A340 aircraft. A monitoring system carries out a continuous monitoring of the shaft line. In this regard, in each lifting wing, a safety brake and a monitoring sensor are mechanically coupled to the shaft. A further safety brake and a monitoring sensor are integrated in the central drive, where by the sensors serve to detect deviating position differences or asymmetries and overspeed conditions. In the event the transmission shaft breaks, only those flaps that remain mechanically coupled to the central drive via the remaining functional portion of the transmission shaft would remain controllable, while the other flaps could no longer be controlled with regard to their respective positions and aerodynamic influences. Such a lack of control could have catastrophic consequences for the overall control and flight safety of the aircraft.

Furthermore, such conventional flap systems including a central drive and a rather long continuous transmission shaft necessitate a rather high installation effort and expense, because the transmission shaft for the flaps or slats respectively must be laid out to run along the trailing edge or the leading edge of the wing. Particularly also, the transmission shaft must be guided or laid out in such a manner to turn through several corners or angles as it transitions from the wing into the fuselage, and then extends transversely through the fuselage. This layout of a continuous transmission shaft in connection with a central drive also results in a relatively high friction exerted on the rotating shaft, and thus a relatively high required drive power already for overcoming the friction, which in turn results in a rather poor operating efficiency. Furthermore, it is necessary to consider the dynamics of the transmission shaft line represented by the rotational spring-mass-damping characteristics.

Moreover, such a continuous transmission shaft necessarily provides a positive fixed mechanical synchronization of all of the flaps or slats connected to the respective shaft. This allows a synchronization of the flaps between the left and right lifting wing to be realized, for controlling or dealing with asymmetrical flap deflections. As is known, an excessive asymmetrical flap deflection of the flap system can lead to critical flight conditions, which are no longer controllable.

Figure 2:
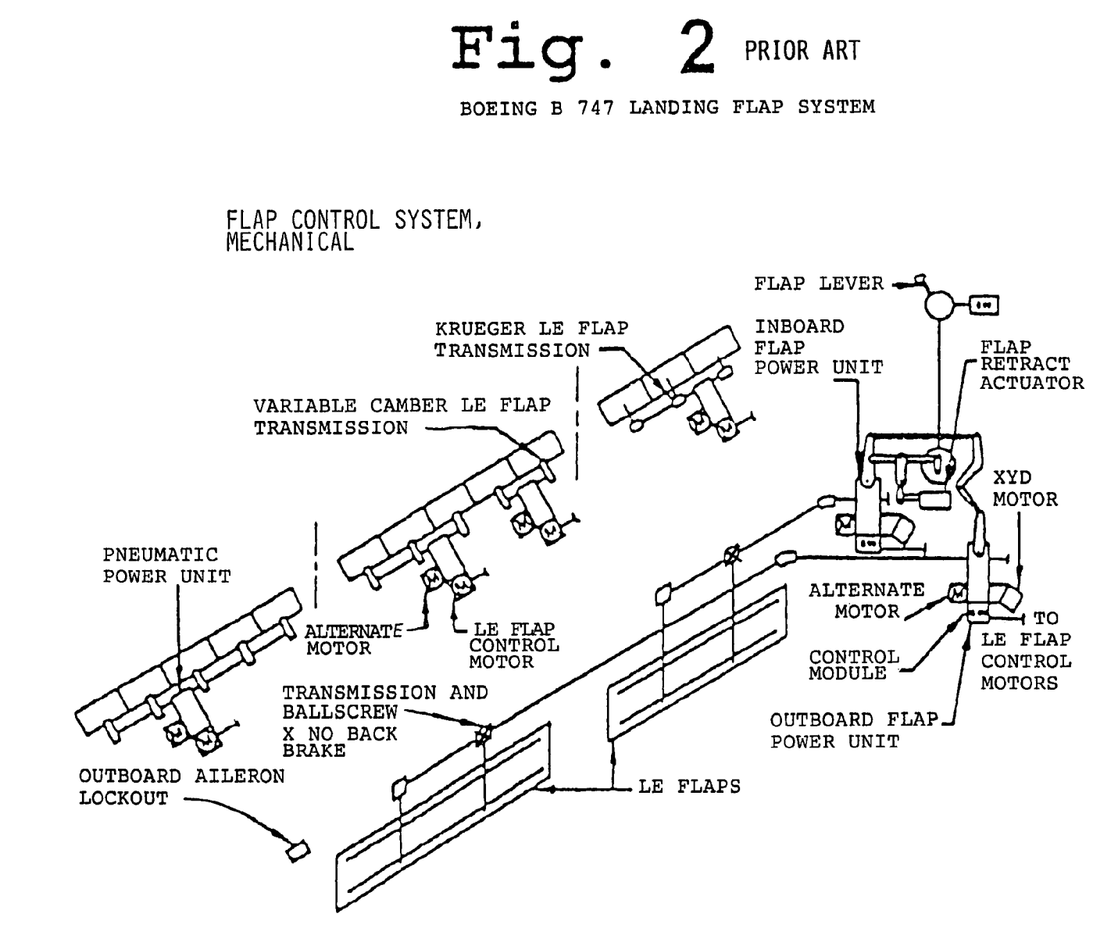
FIG. 2 is a schematic overview of the conventional landing flap system of a Boeing B747 aircraft.

In addition to the above described single shaft line systems, solutions having two shaft lines are also known, for reasons of redundancy. However, in such systems, the flaps or slats of the left wing and of the right wing are mechanically coupled with each other. Such a conventional system is generally shown in FIG. 2, which exemplifies the landing flap system of the Boeing B747 aircraft. In that system, the inboard flaps and the outboard flaps are respectively mechanically coupled via a shaft with a respective drive, and are thereby synchronized with one another.

Furthermore, with reference to the example of the DC9 and DC10 aircraft, it is also conventionally known to provide a flap system in which the flaps arranged on the lifting wing are respectively connected to and driven by individual drives. However, these individual drives are hydromechanically coupled with each other and thereby synchronized in a relatively complex manner. In this regard, two hydraulic cylinders are utilized for moving each respective flap, whereby each individual drive is connected to a common hydraulic system. For this reason, it is not possible to enhance or expand the available functionality of the flap system. Namely, such flap systems have the disadvantage that only a simple or singular flap kinematics can be realized using such a local drive consisting of hydraulic cylinders. Due to the hydraulic coupling of the several drives, an individual deflection or extension/retraction of a single flap is not possible, because all of the drives of all of the flaps are connected to the same hydraulic control valve. A further disadvantage of such a hydraulically coupled system, which is not shown herein, is that any malfunctions or faults in the flap system arising during flight of the aircraft cannot or essentially not be localized, and a relatively time-consuming manual search for the fault site will be necessary while the aircraft undergoes maintenance and service on the ground.

SUMMARY OF THE INVENTION

In view of the above, it is an object of the invention to provide an improved drive system for flaps and/or slats of a fixed wing aircraft, which increases the availability of the flap functions in the event of a failure or malfunction, and increases the functional flexibility and adaptability of the flap system, in comparison to the prior art systems. The invention further aims to avoid or overcome the disadvantages of the prior art, and to achieve additional advantages, as apparent from the present specification. The attainment of these objects is, however, not a required limitation of the invention.

The above objects have been achieved according to the invention in a drive system for leading edge slats and/or trailing edge flaps on a fixed wing of an aircraft, comprising a central flight control arrangement that receives actual current flight data about the flight of the aircraft and dependent on these data provides corresponding actuating information for actuating the slats and/or flaps, at least one central flap/slat control unit conductively connected with the flight control arrangement, and plural drives that are arranged in the wing. These drives are mechanically coupled to the flaps and/or slats by respective drive transmissions. Also, the drives are conductively connected with the flap/slat control unit so as to be individually controllable and actuatable by the flap/slat control unit.

In one embodiment according to the invention, two drives particularly embodied as drive motors or actuator motors are mechanically connected through respective drive transmissions to a flap or slat. The two drives are not mechanically connected to each other via a shaft. Instead, the two drives are electrically synchronized with one another through the corresponding electrical actuating signals provided to these drives by the flap/slat control unit. In a second embodiment of the basic arrangement, two drives embodied as drive motors are mechanically connected through respective drive transmissions to a flap or slat. Additionally, these two drives are both mechanically coupled to a rotational shaft that extends between and interconnects the drives. Thereby, these two drives are mechanically synchronized through this shaft, and are also electrically synchronized through the corresponding actuating signals provided by the flap/slat control unit. In both of these two embodiments, if one of the drives fails, the other drive can still carry out the intended actuation of the respective connected flap or slat.

In a further arrangement or embodiment according to the invention, a plurality of flaps or slats is grouped together as a flap/slat body group, and at least two drives forming a drive station are allocated to this flap/slat body group. Each of these drives is respectively connected mechanically through a respective drive transmission to an associated flap or slat of the group. The two drives are both mechanically coupled to a rotational shaft extending between the drives. Additionally, guide transmissions are coupled to the shaft at positions between the two drives, and are connected to flaps or slats of the flap/slat body group for additionally actuating the respective connected flap or slat. Thus, each flap or slat of the group will be connected to and driven by either one drive and one guide transmission, or two guide transmissions. In this manner, i.e. with these arrangements, if one of the drives or one of the guide transmissions should fail, then drive power can still be delivered to each slat or flap of the respective group by the remaining functional drive or drives, the rotational shaft, and the remaining functional guide transmissions. In other words, each one of these arrangements involves at least two drives driving the rotational shaft, and at least two power transmissions (i.e. either two guide transmissions or one guide transmission and one drive transmission) connected to each flap or slat of the group. This provides redundancy in the event of the failure of one of the drives or one of the transmissions. Thus, in the event of a possible failure of one of the drives, of one of the transmissions, or even a shaft break of the drive shaft, the actuation, control, and monitoring functions of the flap system will not be substantially limited thereby, and will not lead to a total failure of the flap system.

The above arrangements further allow the independent and individual actuation of each group of flaps or slats, and also the independent and individual actuation of the flaps or slats on the left wing relative to the flaps or slats on the right wing of the aircraft. A further advantage is that avoiding a long transmission shaft typical in the prior art reduces the dynamic problems associated therewith, and also reduces the friction acting on the shaft, the drives and the overall flap system. Also, the installation effort, complexity and expense is reduced, and the maintenance of the flap system is simplified.

BRIEF DESCRIPTION OF THE DRAWINGS

In order that the invention may be clearly understood, it will now be described in detail in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

As discussed above, the landing flap systems of the Airbus A340 aircraft and of the Boeing B747 aircraft, as respectively schematically shown in FIGS. 1 and 2, as well as the flap systems of the DC9 and DC10 aircraft, form the general state of the art which is a starting point for the development of the present invention. Thus, these conventional flap systems are generally of interest to provide a better understanding of the invention, by particularly considering the differences between the conventional flap systems and the several example embodiments of the invention that will be discussed in detail hereinbelow.

As a general background, it must be considered that the future requirements in air traffic, for example relating to the increase in air traffic, the requirements of noise reduction, and the realization of a higher flexibility in the take-off and approach paths of airports, place ever higher demands on the functional flexibility and the availability in the event of a malfunction or failure of the flap systems on the lifting wings 1 of an aircraft. This is the basic starting point for the inventive flap system that avoids the disadvantages of flap drives using a single common transmission shaft according to the general design shown in conventional FIG. 1. In contrast, the inventive flap/slat drive system aims to provide individual drives 4, 41, 42, 43, 44 that are mechanically coupled through a respective drive transmission to the respective associated leading edge slat 2 or trailing edge flap 3, in order to actuate the desired movement thereof to achieve the desired aerodynamic slat or flap setting during the flight of the aircraft. These individual drives according to the invention are synchronized in such a manner so that it becomes possible in all flight situations to achieve a differential flap deflection in the wing span direction as well as a uniform and symmetrical flap deflection on the left and right lifting wings 1.

It should be understood that all disclosures herein relating to a trailing edge flap 3 apply similarly to a leading edge slat 2. Thus, both the trailing edge flaps 3 and the leading edge slats 2 are covered or included in the general term "flap" or "lift-enhancing device". Also, the general term "flap system" is understood to include flaps 3 and/or slats 2.

Figure 5:
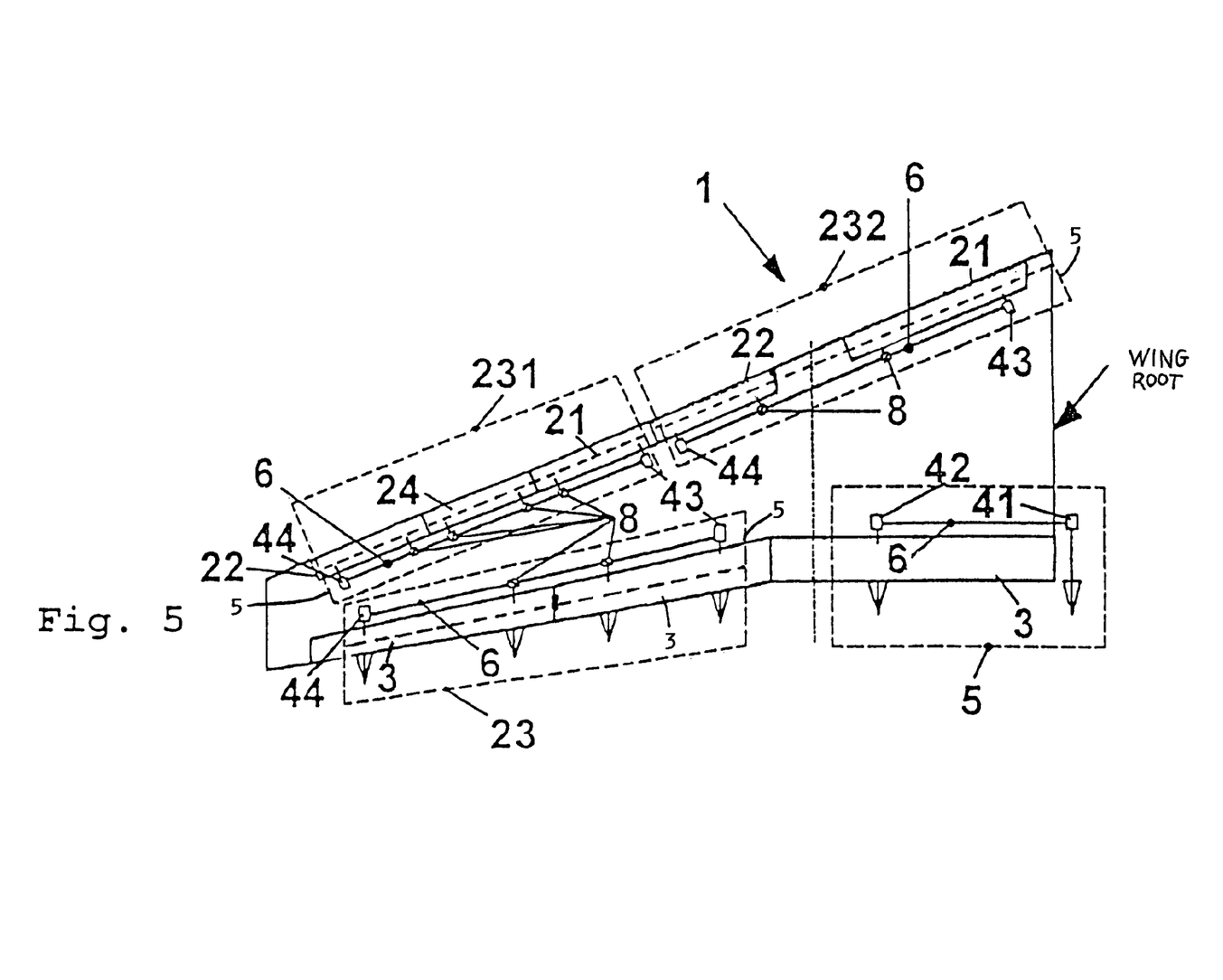
FIG. 5 is a schematic overview of a flap system according to the invention with individual drive arrangements for individual flaps or flap groups similar to FIG. 3, further in combination with individual drive arrangements for individual slat groups.
Figure 6:
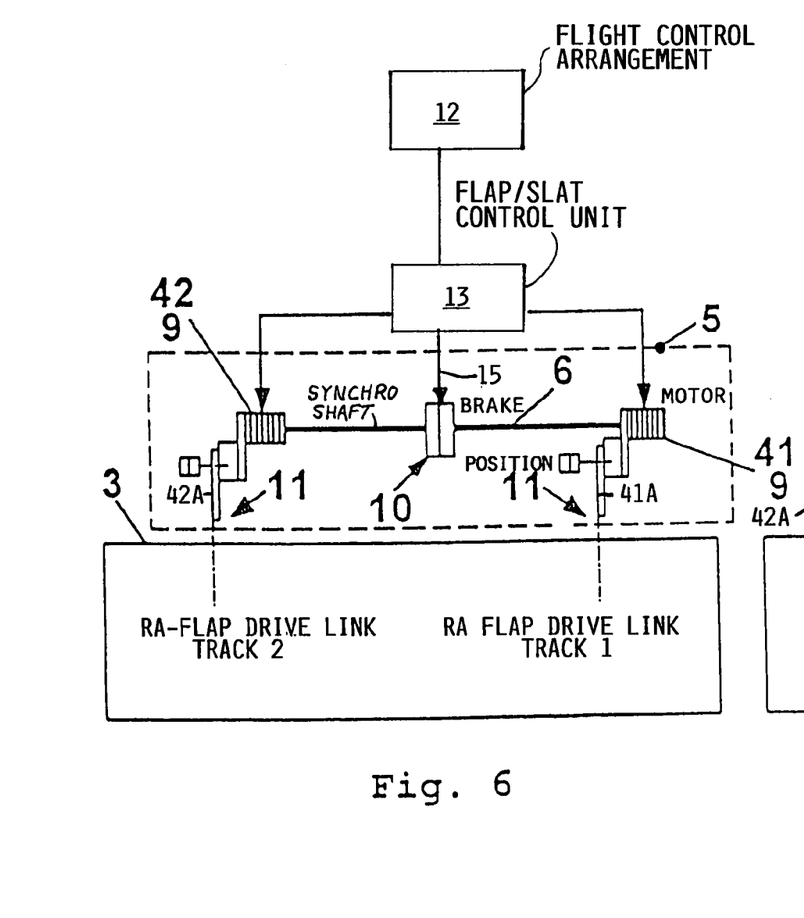
FIG. 6 is a schematic detail view of a drive arrangement including two drives that are electronically synchronized as well as mechanically coupled to each other via a shaft, and that are mechanically connected to a single flap.
Figure 7:
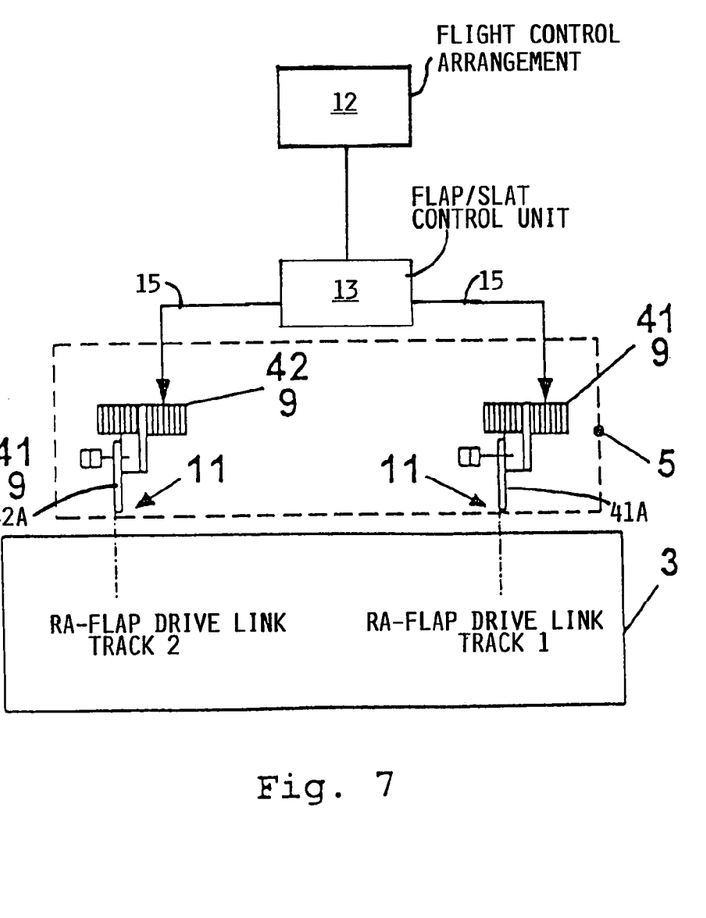
FIG. 7 is a schematic detail view of a drive arrangement including two individual drives that are electronically synchronized but not mechanically coupled to each other, and that are mechanically connected to a single flap.

FIGS. 6 and 7 respectively show two basis system designs for an individual drive arrangement of a given individual flap (i.e. an individual leading edge slat 2 or an individual trailing edge flap 3), which is movably arranged respectively along the leading edge or the trailing edge of the lifting wing 1 as a component of the overall flap system. In the illustrated examples, the pertinent flap is a respective individual trailing edge flap 3. Each individual drive arrangement includes two drives 41, 42, which each respectively comprise a servomotor or actuator motor 9. Either one or both of these basic drive arrangements according to FIGS. 6 and 7 can then be used in particular flap system embodiments as shown and described in connection with FIGS. 3 to 5.

More particularly, FIG. 7 shows perhaps the most basic drive arrangement including a first drive 41 and a second drive 42 that are each respectively connected through a respective drive transmission 41A and 42A to a single flap (or slat) exemplified by a trailing edge flap 3. In this embodiment, the two drives 41 and 42 are not mechanically coupled with each other by a synchronizing shaft, but instead are merely electrically or electronically synchronized with each other when carrying out a flap position adjustment. In this regard, both drives 41 and 42 are connected via signal, control, or data lines 15, for example forming a digital data line or databus, in a signal-transmitting manner, to a central flap (and/or slat) control unit 13 arranged internally in the aircraft. Thereby, the two drives 41 and 42 are individually controlled and actuated by the flap control unit 13, whereby however the operation of the two drives 41 and 42 is electrically synchronized. It is possible to simply branch the signal, control, or data lines 15 so that a direct actuation of the individual drives 41 and/or 42 is achieved from the flap control unit 13 by providing the required actuating signals via the line or lines 15.

Furthermore, the flap control unit 13 is connected via further signal, control, or data lines (e.g. electrical conductors in the form of wires or cables, or optical conductors in the form of optical fibers) with a central flight control arrangement 12, for example comprising a central flight control computer, which is arranged centrally within the aircraft. During the flight of the aircraft, this flight control arrangement 12 receives actual current flight data, carries out an actual/desired value comparison of the actual flight data with prescribed desired flight data in any conventionally known manner, and then provides corresponding actuating information for varying the current flight situation, e.g. the current flight configuration of various control surfaces and the flap system of the aircraft, depending on the result of the above mentioned comparison. This pertinent actuating information is then transferred to the flap/slat control unit 13, which in turn converts the received actuating information into corresponding actuating or control signals which are provided as control commands to the individual drives 41 and 42, and particularly to the respective individual servomotors or actuator motors 9 of the drives 41 and 42. In response thereto, the drives 41 and 42 will, via the mechanical drive transmissions 41A and 42A, drive the flap 3 into the desired flap position.

Figure 3:
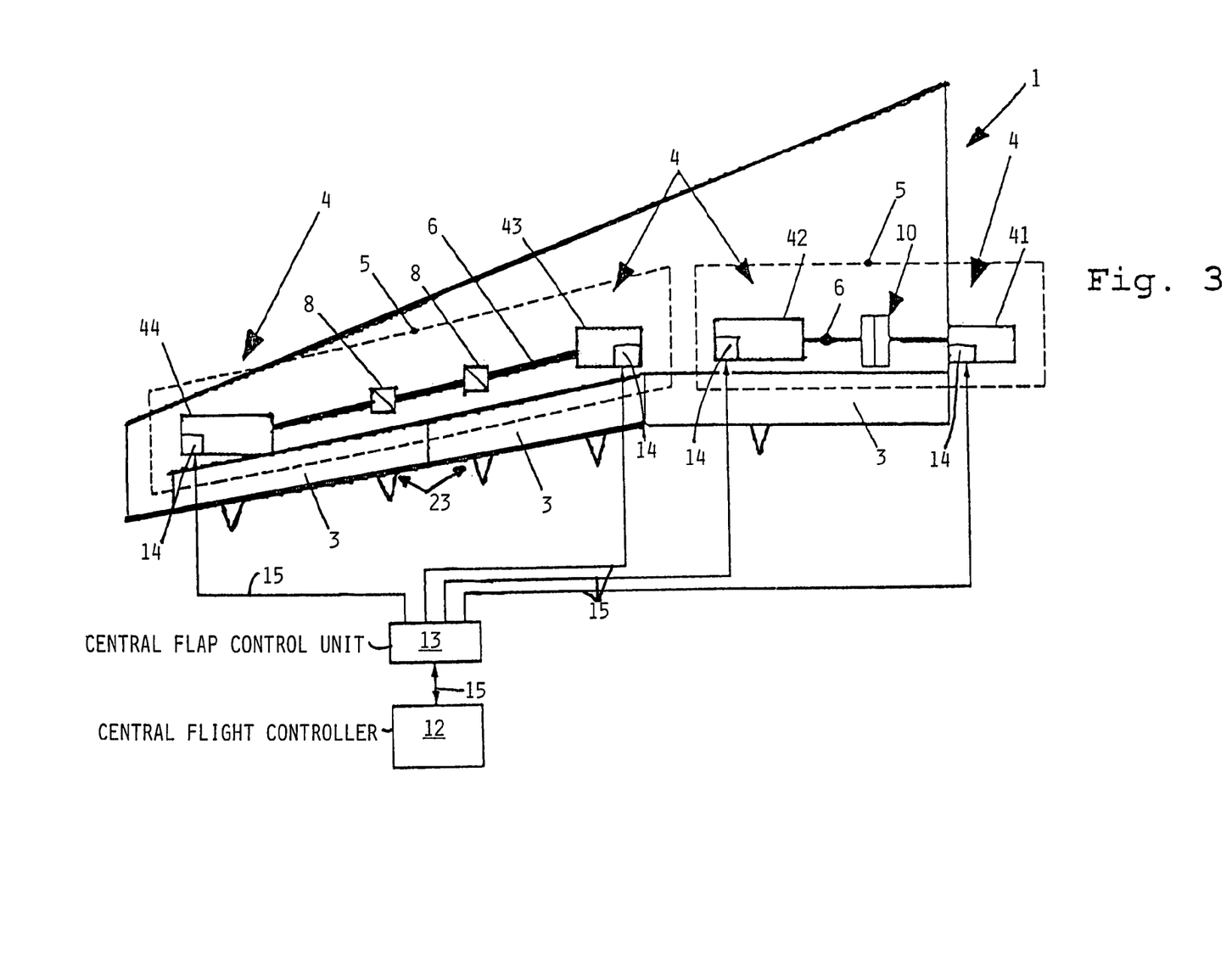
FIG. 3 is a schematic overview of a flap system according to the invention, having individually driven trailing edge flaps or flap groups.

A general schematic overview of the circuit connection of the flight control arrangement 12, the flap/slat control unit 13, and the conductor lines 15 to the respective drives 4, 41, 42, 43, 44 can also be seen in FIG. 3. Such a connection generally pertains in any one of the embodiments exemplified in FIGS. 3 to 7. In general, it should be understood that the central flight control arrangement 12 as well as the centrally located flap control unit or units 13 are each realized with redundant control computers. It is further possible, as indicated schematically in FIG. 3, to provide plural decentralized flap control units 14 at respective locations within the aircraft fuselage or within the lifting wing proximate to the associated leading edge or trailing edge, to act as an intermediary control unit between the central flap control unit 13 and the individual flaps/slats or flap/slat groups that are to be actuated. It is further possible that the individual decentralized flap control units 14 are respectively integrated into the individual drives 4, 41, 42, 43, 44.

Preferably according to the invention, the required actuating information in the manner of actuating signals or commands is to be transferred in electronic form, so that all of the conductive line connections 15 are preferably embodied with digital data lines. In this context, furthermore, the control portion of each one of the drives 4, 41 to 44 is similarly embodied and able to process the received digitized information or signals and then to correspondingly actuate the respective drive so as to thereby adjust the physical flap position of the mechanically connected flap or slat. It is alternatively possible to provide the respective actuating information in the form of analog actuating signals or commands via suitable control and signal conductor lines 15, whereby the control portion of each one of the drives is respectively suitable for receiving and processing such analog signals or commands.

In each of the illustrated embodiments, each respective drive 4, 41 to 44, is a rotational drive comprising a rotational servomotor or actuator motor 9 that can be embodied as a stepper motor 9, as well as an actuator transmission and any conventionally known auxiliary arrangements or devices, for example, for carrying out the respective required drive function. The motor may be an electrically or electronically controlled motor (e.g. a DC motor), which is driven and actuated by the associated flap control unit 13 or 14. Furthermore, the developed motor torque or rotational moment with a controlled actuating speed, especially in the case of a stepper motor, is transmitted to the respective connected drive transmission 41A or 42A, or to an additional rotationally supported shaft 6, as will be described below.

Thus, in the arrangement according to FIG. 7, the two individual drives 41 and 42 are separately and individually electrically controlled and driven. Thereby, the two drives 41 and 42 may be electrically or electronically synchronized in their operation, while these two drives 41 and 42 are not mechanically coupled to each other and thus not mechanically synchronized with each other. In contrast thereto, the arrangement according to FIG. 6 basically begins from the arrangement according to FIG. 7, and further provides a mechanical synchronizing shaft or rotational torsion shaft to which the two drives 41 and 42 are each respectively mechanically connected. Thereby, the operation of the two drives 41 and 42 is additionally mechanically synchronized.

Thus, the arrangement according to FIG. 6 further provides the possibility, in the event of a failure or malfunction of the first drive 41, that the remaining second drive 42 can still drive the associated connected flap 3, perhaps with a reduced speed or power. Conversely, the same is true for the continued operation of the drive 41 in the event of a malfunction or failure of the second drive 42.

Furthermore, an electrically or electronically actuatable shaft brake 10 is preferably installed on the rotatably supported shaft 6 at a position between the first drive 41 and the second drive 42. This shaft brake 10 is connected to the respective associated central flap control unit 13 or decentralized flap control unit 14 in a conductive manner to receive actuating signals therefrom. Generally, as also seen in the particular embodiment according to FIG. 4, this shaft brake 10 is always positioned between two adjacent drives 41 and 42 that are connected to a respective slat or flap. This shaft brake 10 is utilized as a guide brake, on which a position sensor 11 is installed on the shaft 6. This sensor 11, e.g. an optical contactless sensor, is used for monitoring the shaft position and the change or variation of the rotational movement of the shaft 6. Note that such a sensor 11 is also provided in the arrangement according to FIG. 7 without a shaft 6. In that case, or even in FIG. 6, the sensor 11 may be provided on or in connection with the drive transmission 41A and 42A. The position of the sensor is schematically indicated in FIGS. 6 and 7 with an arrow, which can be understood to apply also to the other embodiments of FIGS. 3 to 5.

By the conductive connection 15 of the sensor 11 with the central flap control unit 13 or the decentralized flap control unit 14, the sensor 11 detects the position of the shaft 6 or the drive transmission and its rotational movement, and provides a corresponding, e.g. digital, signal on a current or real-time basis to the flap control unit connected thereto, which in turn provides the corresponding actual current condition or state information of the drive arrangement to the flight control arrangement 12, which can thereby detect any arising malfunction or failure of the shaft 6 or the drive transmission 41A or 42A, evaluate the malfunction or failure condition, and then provide appropriate actuating information for compensating or overcoming the malfunction or failure to the respective flap control unit 13 or 14, which provides corresponding compensating control commands to the connected drives 41 and 42, or at least the remaining functional drive 41 or 42, to compensate for or overcome the malfunction or failure. In this regard, the control commands can be provided to the respective drives either directly from the central flap/slat control unit 13 or further via the decentralized flap/slat control unit 14, depending on the particular arrangement either without or with such decentralized control units 14.

In this regard, it should be considered that a serious failure or malfunction condition, such as a canted or twisted jamming of two adjacent trailing edge flaps 3, would lead to a switching-off of the respective drives 41, 42 and 43, 44 of two neighboring drive stations 5.

From the above it should be understood that at least two drives 41, 42 form a drive station 5 according to the invention, whereby these drives 41, 42 of the respective drive station 5 are connected either to the central flap control unit 13 or to the respective associated decentralized flap control unit 14 in a conductive manner, and preferably directly. The term "direct connection" relates to a connection by a conductor wire or the like, while an "indirect connection" means that there may be an interposed signal processing or altering component. Most particularly, an "indirect connection" of the drives to the central control unit 13 means that one or more decentralized control units 14 may be interposed and connected between the drives and the central control unit. In this manner, the drives are controllable primarily in a synchronized manner, but may alternatively be controlled individually and selectively as required. It is further possible that more than two drives 41 and 42 are mechanically coupled to an individual slat 2 or flap 3, if one wishes to further limit the risk of the failure of the flap drive, i.e. of an inability to adjust the flap position, e.g. to provide further redundancy in the event of the failure of both a first drive 41 and a second drive 42. In such an arrangement with more than two drives making up a drive station 5, each successive drive after the second drive 42 will also primarily be considered as a redundant drive that is available for the above described redundancy use.

Figure 4:
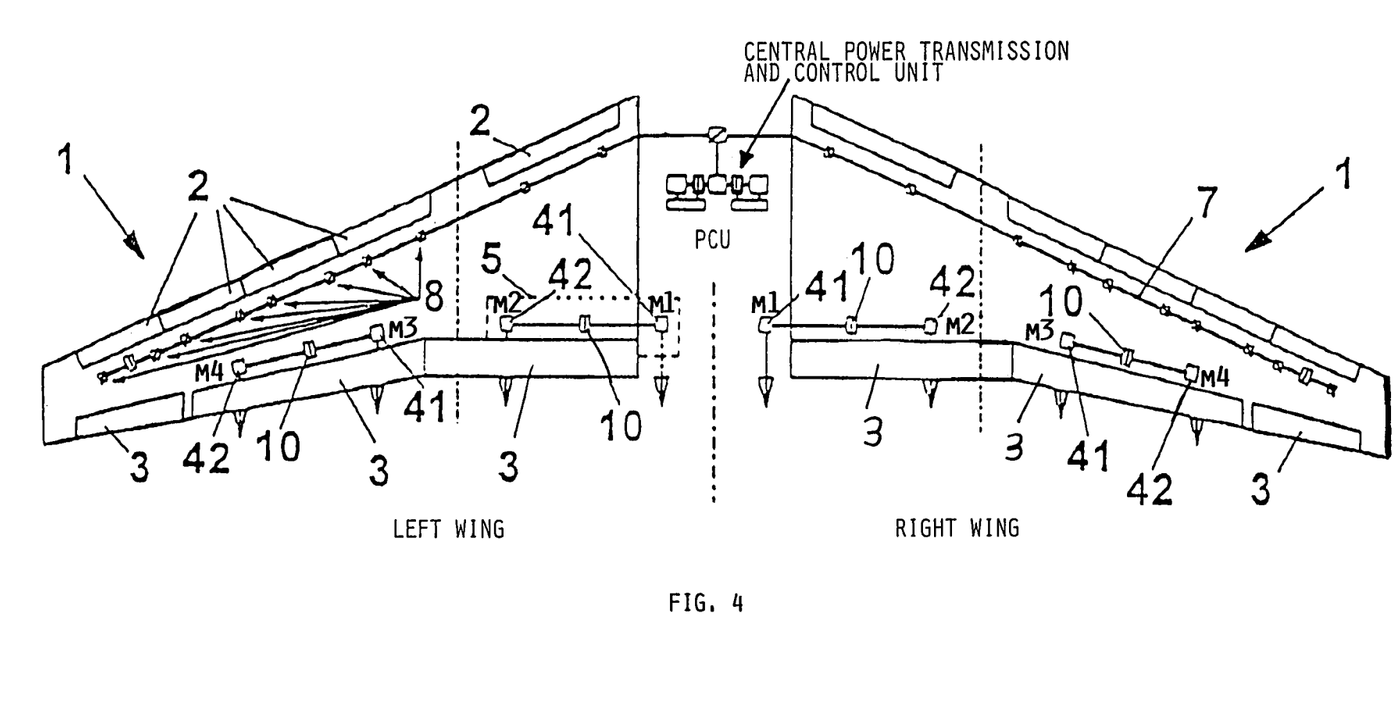
FIG. 4 is a schematic overview of a flap system according to the invention, with individual drive arrangements for individual trailing edge flaps, combined with a common shaft drive with a central drive for the leading edge slats.

As mentioned above, the drive arrangements as shown and described in connection with FIGS. 6 and 7 can each be used in various embodiments of the overall flap or slat drive system according to the invention, for example as shown in FIGS. 3 to 5. Each of the illustrated embodiments in FIGS. 3 to 5 uses a mechanical synchronizing shaft connected between two drives in the manner of FIG. 6. Nonetheless, it should be understood that the arrangements of FIGS. 3 to 5, or other embodiments, could alternatively use the shaft-less drive arrangement according to FIG. 7.

Referring now in detail to FIG. 3, this schematic illustration shows three trailing edge flaps 3 arranged along the trailing edge of a lifting wing 1, as well as a first drive station 5 associated with the single inboard flap 3 and a second drive station 5 associated with the mid-position flap 3 and the outboard flap 3, which together form a flap body group 23.

The first drive station 5 located near the root of the wing 1 includes a first drive 41 and a second drive 42, which are each mechanically connected, e.g. via an individual drive transmission (not shown), to the single inboard flap 3, and are mechanically connected or coupled to each other through a rotatably supported torsion shaft or synchronizing shaft 6. This drive station 5 further includes a shaft brake 10 installed on the shaft 5, and is generally configured and embodied according to the drive arrangement described above in connection with FIG. 6.

The second drive station 5 associated with the flap body group 23 at the mid-portion and outboard portion of the wing 1 remote from the root thereof includes two drives 43 and 44 mechanically connected to the opposite ends of a rotatably supported torsion or synchronizing shaft 6. Each of the drives 43 and 44 is individually mechanically connected, e.g. through an individual drive transmission (not shown), to a respective individual one of two trailing edge flaps 3 making up the group 23.

Additionally, two guide transmissions 8 are mechanically connected to the shaft 6 at two respective positions between the two drives 43 and 44, and these guide transmissions 8 are individually connected to the mid-position flap 3 and to the outboard flap 3. The control and drive actuation of the two drives 43 and 44 generally corresponds to the drive control and actuation as discussed above in connection with FIGS. 6 and 7.

FIG. 4 schematically shows a flap drive arrangement in which a respective drive station 5 embodied according to FIG. 6 is provided for and associated with each individual flap 3 along the trailing edge of the wing 1. Namely, each drive station 5 includes first and second drives 41 and 42 that are each individually connected to the flap 3 associated with that drive station 5, a synchronizing shaft interconnecting the two drives 41 and 42, and preferably a shaft brake 10 installed on the synchronizing shaft. For the sake of clarity and simplicity, the respective drive stations 5 associated with the outboard flaps 3 on the left wing 1 and the right wing 1 are omitted from the drawing of FIG. 4. Nonetheless, it should be understood that a drive station 5 according to FIG. 6 could also be individually provided for each of the outboard flaps. The control and actuation of the two drives 41 and 42 of each drive station 5 is carried out in the above described manner.

FIG. 4 further shows a plurality of leading edge slats 2 arranged along the leading edge of both the left wing 1 and the right wing 1. The adjusting motion of the slats 2 is carried out via guide transmissions 8 that are mechanically connected to a continuous transmission shaft 7 and also mechanically coupled to the respective associated slats 2. Thus, a rotation of the transmission shaft 7 is converted through the individual guide transmissions 8 to an actuating motion of the respective associated slats 2, whereby two of the guide transmissions 8 are connected to each one of the slats 2. This transmission shaft 7 is connected to a central drive or power control unit (PCU) that is centrally located in the manner of the conventionally known drive arrangements. Thus, FIG. 4 makes clear that the inventive drive arrangement can also be used in combination with features from conventional drive arrangements.

FIG. 5 schematically shows a left wing 1 with flaps 3 and drive stations 5 arranged along the trailing edge of the wing similarly as in FIG. 3. Thus, the first or inboard drive station 5 drives the single inboard flap 3 near the root of the wing 1, while the mid-position flap 3 and the outboard flap 3 are grouped together to form a flap body group 23, which is driven by the outboard drive station 5. All of the above discussion relating to FIG. 3 in this regard similarly applies to the same arrangements in FIG. 5, and will not be repeated here.

Additionally, FIG. 5 shows two slat body groups 231 and 232 arranged on the leading edge of the wing 1. A first or inboard slat body group 232 includes first and second slats 21 and 22 arranged successively next to one another in the span direction from the root end of the wing 1. This slat body group 232 also comprises or is associated with a drive station 5 including two drives 43 and 44 mechanically connected to the opposite ends of a rotatably supported shaft 6. Furthermore, the drive 43 is mechanically coupled, e.g. through a drive transmission, with the first slat 21, while the second drive 44 is mechanically coupled, e.g. through a drive transmission, to the second slat 22. Additionally, this drive station includes two guide transmissions 8 that are mechanically connected to the shaft 6 spaced apart from each other at positions between and spaced from the two drives 43 and 44. One of these guide transmissions 8 is mechanically coupled with the first slat 21, while the other guide transmission 8 is mechanically coupled with the second slat 22. Thus, each one of the slats 21 and 22 is driven, for example at its lateral edges, via respective transmission linkages by one drive 43 or 44, and by one guide transmission 8. Note that the adjacent lateral ends of the two slats are spaced apart from each other, so that the respective slats can be moved, i.e. extended or retracted, freely without hindrance.

The second slat body group 231 includes a third slat 21, a fourth slat 24, and a fifth slat 22 arranged in succession in the span direction toward the wing tip of the wing 1. This slat body group 231 is associated with or comprises a further drive station 5, which, similar to the inboard drive station, includes two drives 43 and 44, as well as a rotational shaft 6 interconnecting the drives 43 and 44, and plural guide transmissions 8 connected to the shaft 6 and individually connected to respective ones of the slats 21, 22 and 24. Particularly, the end-most slats 21 and 22 of this group 231 are connected similarly as the slats 21 and 22 of the group 232, namely respectively to one of the drives 43 or 44, and to one of the guide transmissions 8. On the other hand, the fourth intervening slat 24 is not connected directly to either one of the drives 43 or 44, but instead is connected by two guide transmissions 8 to the shaft 6.

Thus, in each of the slat body groups 231 and 232 in FIG. 5, just as in the flap body groups discussed above, the drive stations 5 respectively provide a flexibly adaptable drive power transmission line with safety redundancy. Namely, if one of the drives 43 or 44 fails or malfunctions, then the remaining drive 44 or 43 can still drive all of the slats of the respective slat body group via the remaining functional shaft 6 and the guide transmissions 8. For a particular given slat, if a guide transmission or drive transmission connected thereto fails or malfunctions, then the slat can still be driven by the remaining functional guide transmission or drive transmission connected thereto. Also, the slat movements of all of the slats of a respective group are synchronized with each other electrically or electronically through the control of the drives, and also mechanically through the synchronizing shaft. The two slat groups 231 and 232, however, can be actuated independently and differentially relative to each other. It also is possible to actuate the slat groups on the left wing and on the right wing independently and differently with respect to each other. Nonetheless, it is alternatively possible to actuate all of the slats in a synchronized and symmetrical manner, through appropriate electrical or electronic control and actuation of the drives.

It can be seen that the inventive flap and/or slat drive system with electronically synchronized drives 41 to 44 for driving the flaps and/or slats on a lifting wing 1 of a fixed wing aircraft provides improvements over the conventionally known flap systems according to FIGS. 1 and 2, and according to the flap systems of the DC9 and DC10 aircraft which are not shown.

In the inventive systems presented as examples according to FIGS. 3 to 7, each flap or slat (or each flap/slat group) is individually actuated, so that a differential deflection of respective flaps or slats in the span direction as well as a differential deflection of slats or flaps on the left wing and the right wing are possible. Furthermore, a coupling of plural flaps or slats, or the associated drives thereof on one of the wings is further possible, and is independent of the respective wing configuration.

An exemplary embodiment with individual drives for the individual trailing edge flaps is shown in FIG. 4 for a left wing, and could be similarly provided in a mirror-image fashion on the right wing. FIG. 5 shows an example of individual drives for trailing edges flaps and for leading edge slats, whereby plural flaps or slats can be mechanically coupled into a flap/slat body group. Furthermore, as represented in FIGS. 6 and 7 respectively, the coupling and synchronization of two drives of a single drive station can be achieved mechanically through a torsion shaft as well as electronically, or can be achieved purely electronically. This relates to the coupling and synchronization of the drives for a single flap/slat or a single flap/slat group on one wing. On the other hand, the synchronization between the flaps/slats of the left wing and of the right wing is achieved purely electronically. Namely, there is no coupling shaft or synchronizing shaft that extends through the fuselage between the two wings of the aircraft. The functions of monitoring and synchronizing the operation of the drive system are carried out by a central flap control unit 13 such as a central control computer, and/or via decentralized flap control units 14 such as several distributed control computers. Such decentralized flap control units can also be provided in so-called "smart actuators" with integrated local monitoring and control functions, i.e. with the respective control unit integrated into the actuator itself.

The principle advantages of the individually driven flap and slat system according to the invention are an increased functional flexibility and adaptability, as well as an increased availability of a functioning drive train linkage in the event of a fault or failure of a particular component. Furthermore, the installation effort and expense are reduced, for example due to the omission of complex shaft routing through the aircraft fuselage between the two wings. Also, by omitting relatively long conventional common transmission shafts, the dynamic problems of routing and supporting such a long shaft in the aircraft body are reduced, whereby a lower friction arises, and correspondingly a reduced power is required of the drives. Still further, the maintenance and servicing are simplified and improved, and in the event of a malfunction the location of the fault can be more easily localized. Due to the electronic or electrical control and variable or selective synchronization and positioning, it becomes possible to synchronously or asynchronously and symmetrically or asymmetrically position individual flaps/slats or flap/slat groups as desired.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft including a fuselage, a left wing and a right wing connected to and extending from said fuselage, and high-lift devices selected from the group consisting of slats or leading-edge flaps movably arranged along leading edges of said wings and trailing-edge flaps movably arranged along trailing edges of said wings, an improved flap or slat drive system comprising:
a control arrangement that receives flight data and control commands, and that generates actuating information pertinent for setting positions of said high-lift devices dependent on at least one of said flight data and said control commands;

first and second high-lift device groups, wherein each one of said groups respectively includes at least one said high-lift device; and first and second drive stations respectively individually allocated to said first and second high-lift device groups, wherein each one of said drive stations respectively includes two drives that are conductively connected directly or indirectly with said control arrangement, and two drive transmissions that are respectively individually mechanically connected to said two drives and that are mechanically connected to said at least one high-lift device of said high-lift device group to which said drive station is allocated;

wherein said first and second high-lift device groups are driven individually and independently of one another by said first and second drive stations respectively allocated to said first and second high-lift device groups, so that said first and second high-lift device groups are selectively drivable synchronously and asynchronously relative to one another.

2. The flap or slat drive system in the aircraft according to claim 1, wherein said respective drives of said first and second drive stations are individually controllable and actuatable by said control arrangement.

3. The flap or slat drive system in the aircraft according to claim 1, wherein said drives are arranged internally within at least one of said wings.

4. The flap or slat drive system in the aircraft according to claim 1, wherein said drive station does not include a shaft mechanically coupling said two drives thereof to each other, and said two drives are electronically or electrically synchronized with each other with respect to a driving operation thereof.

5. The flap or slat drive system in the aircraft according to claim 4, wherein said high-lift device group to which said drive station is allocated includes only a single one of said high-lift devices, and said two drive transmissions are both mechanically connected to said single one high-lift device.

6. The flap or slat drive system in the aircraft according to claim 1, wherein said drive station further includes a rotatably supported shaft that is mechanically connected to both said drives thereof, whereby said drives are mechanically coupled to each other.

7. The flap or slat drive system in the aircraft according to claim 6, wherein said high-lift device group to which said drive station is allocated includes only a single one of said high-lift devices, and said two drive transmissions are both mechanically connected to said single one high-lift device.

8. The flap or slat drive system in the aircraft according to claim 6, wherein said high-lift device group to which said drive station is allocated includes a plurality of said high-lift devices arranged successively adjacent one another in a span direction of one of said wings, a first one of said two drive transmissions is mechanically connected to a first one of said high-lift devices, and a second one of said two drive transmissions is mechanically connected to a second one of said high-lift devices.

9. The flap or slat drive system in the aircraft according to claim 8, wherein said drive station further comprises at least one guide transmission that is respectively mechanically connected to said shaft at a location between and spaced respectively from said two drives, and that is respectively mechanically connected to a respective one of said high-lift devices.

10. The flap or slat drive system in the aircraft according to claim 9, wherein said high-lift device group includes exactly two of said high-lift devices being said first and second high-lift devices, said drive station includes exactly two of said guide transmissions, a first one of said guide transmissions is mechanically connected to said first high-lift device, and a second one of said guide transmissions is mechanically connected to said second high-lift device.

11. The flap or slat drive system in the aircraft according to claim 9, wherein said high-lift device group includes exactly three of said high-lift devices consisting of said first and second high-lift devices and a third one of said high-lift devices between said first and second high-lift devices, said drive station includes exactly four of said guide transmissions, a first one of said guide transmissions is mechanically connected to said first high-lift device, second and third ones of said guide transmissions are both mechanically connected to said third high-lift device, and a fourth one of said guide transmissions is mechanically connected to said second high-lift device.

12. The flap or slat drive system in the aircraft according to claim 6, wherein said drive station further comprises an electrically actuatable shaft brake that is arranged and acts on said shaft at a location between said two drives, and that is conductively connected directly or indirectly with said control arrangement.

13. The flap or slat drive system in the aircraft according to claim 6, wherein said drive station further comprises a sensor that is arranged on said shaft, is adapted to sense a rotational position of said shaft, and is conductively connected directly or indirectly with said control arrangement.

14. The flap or slat drive system in the aircraft according to claim 1, wherein said drive station further comprises a sensor that is arranged and adapted to sense an actuation position of one of said drives or one of said drive transmissions, and that is conductively connected directly or indirectly with said control arrangement.

15. The flap or slat drive system in the aircraft according to claim 1, wherein each said drive is a rotational drive comprising an actuating motor.

16. The flap or slat drive system in the aircraft according to claim 15, wherein said actuating motor is a stepper motor having a controllable actuating speed and motor torque.

17. The flap or slat drive system in the aircraft according to claim 15, wherein said actuating motor is an electrically or electronically controlled motor that is controlled directly or indirectly by said control arrangement.

18. The flap or slat drive system in the aircraft according to claim 1, wherein said control arrangement comprises a central control unit and plural decentralized control units that are respectively allocated to said drives, and that are respectively interposed and conductively connected between said drives and said central control unit, whereby said drives are conductively connected indirectly to said central control unit respectively through said decentralized control units.

19. The flap or slat drive system in the aircraft according to claim 18, wherein said decentralized control units are arranged in one of said wings proximate to said leading edge or said trailing edge thereof.

20. The flap or slat drive system in the aircraft according to claim 18, wherein said decentralized control units are respectively integrated with said drives in said drive station.

21. The flap or slat drive system in the aircraft according to claim 18, wherein said central control unit and each one of said decentralized control units respectively comprises a respective control computer, and are collectively adapted to monitor and synchronously control said drives of one said drive station.

22. The flap or slat drive system in the aircraft according to claim 1, wherein said control arrangement comprises a central control unit and a central flight control arrangement that receives the flight data and the control commands, and that generates the actuating information, wherein said central control unit is conductively connected with said flight control arrangement.

23. The flap or slat drive system in the aircraft according to claim 22, comprising digital data lines by which said central control unit is conductively connected with said flight control arrangement and by which said drives are conductively connected with said central control unit.

24. The flap or slat drive system in the aircraft according to claim 1, wherein said first and second high-lift device groups are not mechanically or hydraulically interconnected with one another.

25. The flap or slat drive system in the aircraft according to claim 24, wherein said first and second high-lift device groups are located on a same wing among said two wings.

26. The flap or slat drive system in the aircraft according to claim 24, wherein said first and second high-lift device groups are respectively located one on each of said two wings.

27. The flap or slat drive system in the aircraft according to claim 1, not including a transverse shaft line that extends through said fuselage from one to another of said wings.

28. The flap or slat drive system in the aircraft according to claim 1, further including only straight shaft lines connected to said drives, and not including any angles, bends or kinks in any shaft lines.

29. The flap or slat drive system in the aircraft according to claim 1, wherein said high-lift devices of said first high-lift device group and of said second high-lift device group all are said trailing-edge flaps or all are said slats or all are said leading-edge flaps.

* * * * *